3,644,499
PROCESS FOR PREPARING DETERGENT
SULFONATES
Clarence R. Murphy, Allison Park, Anatoli Onopchenko, Pittsburgh, and John M. Piatt and Richard Seekircher, Cheswick, Pa., assignors to Gulf Research & Development Company, Pittsburgh, Pa.
No Drawing. Filed Dec. 17, 1968, Ser. No. 784,485
Int. Cl. C07c *143/02, 143/04*
U.S. Cl. 260—513 B         7 Claims

ABSTRACT OF THE DISCLOSURE

A process for stabilizing the pH of sulfonates obtained from the reaction of an olefinic compound with an alkali bisulfite which involves contacting an aqueous slurry of such sulfonates containing an alkaline compound with oxygen.

---

An olefinic compound, such as dodecene-1, can be reacted with an alkali bisulfite, such as sodium bisulfite, in the presence of a free-radical initiator, such as azobisisobutyronitrile, to obtain a sulfonate addition product thereof, such as a sodium alkane sulfonate, which possesses excellent detergency properties. Even though the reaction can be carried out under conditions such that the final sulfonate addition product will have a neutral or substantially neutral pH, we have found that within a relatively short time, in some instances within a few hours, the product will become highly acidic and the pH thereof can fall to a level of about 2 to 3. Since a detergent formulated from such product would thus be commercially unattractive and metal in contact therewith would be adversely affected because of the acidic nature of the product, the economic value of such product would, therefore, be expected to be slight.

We have found, however, that the pH of such addition product can be stabilized and the initial neutral or substantially neutral pH thereof can be maintained by the mere expedient of treating an aqueous slurry of such product containing an alkali metal compound with oxygen.

As noted the desired detergent product obtained herein results from the reaction of an olefinic compound with an alkali bisulfite. The olefinic compound employed can be a straight or branched chain, internal or terminal, olefinic compound having from five to 20 carbon atoms, preferably from 10 to 18 carbon atoms, such as pentene-1, hexene-1, heptene-1, octene-1, decene-1, dodecene-1, tetradecene-1, eicosene-1, pentene-2, hexene-2, hexene-3, heptene-2, heptene-3, octene-2, octene-3, octene-4, eicosene-2, eicosene-4, eicosene-5, eicosene-8, eicosene-10, polymers of propylene, butylene, or isobutylene; cyclohexene, methylcyclohexene, propylcyclohexene, etc. Of these we prefer to employ straight chain terminal olefins. Any alkali bisulfite can be employed in the reaction with the olefinic compound defined above. By "alkali" in this context we intend the same to refer to an alkali metal, alkaline earth metal, amine, ammonium, etc. Examples of such alkali bisulfites are alkali metal bisulfites, such as sodium, potassium, rubidium, cesium and lithium bisulfites, etc.; alkaline earth metal bisulfites, such as calcium, strontium and magnesium bisulfites; ammonium bisulfite and amine bisulfites, such as triethanolamine bisulfite, etc. Of these, the alkali metal bisulfites, especially sodium bisulfite, and ammonium bisulfite are preferred. The molar ratio of the alkali bisulfite to olefinic compound can be varied over a wide range, for example, from about 10:1 to about 1:10, although a molar range of about 1.1:1 to about 2:1 is preferred. The reaction must be carried out in a pH range of about 4 to about 9, preferably in the range of about 6 to about 8, because above a pH of about 9 the desired bisulfite ion is largely neutralized to sulfite which is nonreactive, while below a pH of about 4 the bisulfite is converted to sulfurous acid which can decompose to $SO_2$ and water. Within the defined pH range less difunctional sulfur compounds are formed. In order to control the pH at the desired level a basic reagent is added to the reaction mixture. An alkaline compound, such as sodium sulfite, is preferred for this purpose, although any compound can be used which under the conditions of the reaction reacts with the alkali bisulfite to form the corresponding alkali sulfite. Examples of such basic reagents which can be used include basic metal oxides, basic metal hydroxides, basic nitrogen compounds, etc., such as sodium oxide, potassium oxide, magnesium oxide, sodium hydroxide, potassium hydroxide, magnesium hydroxide, ammonia, trimethyl amine, etc. The amount of basic reagent employed need be just the amount required to obtain and maintain the desired pH, for example, the molar amounts thereof relative to the alkali bisulfite being in the range of about 1:1 to about 1:20, preferably about 1:4 to about 1:15.

The desired reaction must be carried out in the presence of an organic solvent and water or other polar solvents for the purpose of solubilizing the hydrocarbons and the salts, respectively, in the reaction system. Examples of organic solvents that can be used are alcohols having from one to 12 carbon atoms, preferably from one to four carbon atoms, such as methanol, ethanol, 1-propanol, 2-propanol, 1-butanol, 2-butanol, 2-methyl-2-propanol, etc.; ketones, such as acetone methylethyl ketone, diethylketone, diisobutylketone, etc.; tetrahydrofuran, dimethylformamide, etc. Other polar solvents that can be used in place of water include dioxanes, such as 1,3-dioxane, 1,4-dioxane, etc., glycols, such as ethylene glycol, propylene glycol, diethyleneglycol, etc. The amounts of such solvents that need be present are those amounts sufficient to solubilize the contents of the reaction system. Thus, the weight ratio of hydrocarbon solvent to olefinic compound can be from about 2:1 to about 4:1, preferably from about 1.5:1, to about 3.5:1, and the weight ratio of water or polar solvent to olefinic compound can be from about 1:1 to about 5:1, preferably from about 1.5:1 to about 3:1.

The reaction between the olefinic compound and the alkali bisulfite must be carried out in the presence of a free radical initiator. Any free radical initiator known for such reaction can be employed. Thus, oxygen; nitrogen-containing initiators, such as azobisisobutyronitrile, azobisdimethylvaleronitrile, azobismethylpropionitrile, etc.; aliphatic and aromatic peresters in which the peroxy group is attached to at least one tertiary carbon atom such as t-butyl perbenzoate, t-butyl pertoluate, di-t-butyl perphthalate, t-butyl peroxyisobutyrate, t-butyl peroxypivalate, t-butyl peracetate, etc.; inorganic peroxides, such as hydrogen peroxide, sodium peroxide, barium peroxide, lithium peroxide, potassium peroxide, etc.; organic peroxides, such as benzoyl peroxide, methylethylketone peroxide, acetyl peroxide, ditertiary butyl peroxide, lauroyl peroxide, etc.; organic hydroperoxides, such as tertiary butyl hydroperoxide, dimethyl - bis(hydroperoxy)hexane, cumene hydroperoxide, etc.; inorganic oxygen-containing salts, such as sodium nitrate, sodium nitrite, etc. The amount of free radical initiator can be, for example, from about 0.25 to about 10, preferably from about one to about five percent, by weight based on the olefinic compound.

The reaction conditions can be maintained over a wide range. Thus, the temperature can be from about 70° to about 200° F., preferably from about 150° to about 170° F., the pressure from about atmospheric to about 1000 pounds per square inch gauge, preferably from about atmospheric to about 20 pounds per square inch gauge, and the reaction time about 30 minutes to about 15 hours, preferably about six to about twelve hours.

At the end of the reaction period the reaction product will contain from about two to about 50 percent, preferably from about five to about 10 percent of the unreacted olefinic compound and/or alkali bisulfite, substantially all of the basic reagents, as such or as the corresponding sulfate, used to control pH, the organic solvent, water or other polar solvent used and the desired sulfonate. The free radical initiator is presumably not present, since it is believed to be destroyed in the reaction. The desired sulfonate addition product is believed to be a mixture of three types of compounds resulting from the addition of the alkali bisulfite to the olefin. Thus, when sodium bisulfite is used, the mixture is believed to result in the formation of the three types of compounds, a sodium alkane sulfonate, a sodium alkane sulfonate-sulfinate and a sodium alkane disulfonate. Based on the total sulfonate compounds, the sodium alkane sulfonate is believed to be present in an amount of about 10 to about 70 percent by weight, the sodium alkane sulfonate-sulfinate about 0 to about 40 percent by weight and the sodium alkane disulfonate about five to about 75 percent by weight.

The sulfonate addition product can be recovered from the reaction product in any convenient manner. For example, unreacted olefin present can be removed by decantation. If oxygen has been used as a free radical initiator the basic reagent employed to control the pH is not present as such but has been converted to a basic sulfate corresponding to the alkali bisulfite used. If a free-radical initiator other than oxygen has been used, the basic reagent will be present in its original form in the reaction product. To convert the basic reagent to a basic sulfate corresponding to the alkali bisulfite used, molecular oxygen in an amount which can be, for example, about 1.5 to about 20 mols per mol of basic reagent, can be passed through the reaction product at a temperature of about 70° to about 150° F., preferably about 100° to about 140° F., for a period of about one to about 10 hours. The reaction mixture will tend to resolve itself into two phases, a lower phase containing the salts and an upper organic phase containing the remainder of the reaction mixture. Separation of the two phases can be effected in any convenient manner, for example, by decantation. The organic phase can then be dried, for example, at a temperature of about 50° to about 350° F., leaving behind the three organic sulfonates identified above, which can then be formulated, by known procedures, to serve as an active ingredient in a detergent, for example, a detergent bar.

As noted, even when the organic sulfonates so produced have an acceptable pH, subsequently the pH thereof has a tendency to drift substantially into the acidic range. We have found that the pH of such product can be substantially stabilized by the mere expedient of contacting an aqueous slurry of such product containing an alkaline compound with oxygen. For example, the pH of the stabilized product will vary no more than about 20 percent from the pH of the product originally produced. It is absolutely necessary that water, an alkaline compound and oxygen be used during such treatment, for we have found that the use of water and an alkaline compound alone or water and oxygen alone will not suffice.

The stabilization is easily effected. Thus, the detergent sulfonate addition product obtained from the addition of the bisulfite compound to the olefinic compound is mixed with water sufficient to obtain a slurry therewith, for example, about 50 to about 95 percent by weight, preferably about 60 to about 80 percent by weight of water relative to the total slurry. The alkaline compound is then added to the slurry in an amount, for example, that can range from about five to about 50 mol percent, preferably about 10 to about 45 mol percent based on the sulfonate addition product. Any alkaline compound can be used, for example, alkali hydroxides, such as sodium hydroxide, potassium hydroxide, ammonium hydroxide, etc. The slurry need not be formed in the sequence defined above, for the alkali metal compound can first be added, followed by water.

After the slurry has been formed it is treated with a compound containing oxygen, such as hydrogen peroxide, inorganic peroxides, such as barium peroxide, potassium peroxide, etc., preferably a medium containing molecular oxygen, for example, air or a mixture of oxygen with inert gases, while the slurry is maintained at a temperature of about 70° to about 300° F., preferably about 150° to about 200° F., and a pressure of about 50 to about 400 pounds per square inch gauge or higher, preferably about 200 to about 275 pounds per square inch gauge, over a period of about one to about 15 hours, preferably about two to about eight hours. The amount of oxygen as such can vary over the range of about 10 to about 200 mol percent, preferably about 30 to about 140 mol percent, based upon sulfonate addition product. In a preferred embodiment molecular oxygen is passed through the aqueous slurry at an hourly rate of about two to about 50 mol percent preferably about 10 to about 30 mol percent based on the sulfonate addition product. While the above treatment is the preferred embodiment, it is understood that, if desired, the addition product can be treated sequentially, that is, oxidation, addition of water and addition of alkaline compound, under the conditions defined above, and the procedure defined herein is intended to include the same.

At the end of the above treatment the sulfonate addition product is recovered from the slurry in any suitable manner. For example, an organic solvent, similar to the organic solvent employed during the addition of the bisulfite to the olefinic compound, can be added to the slurry in an amount that can be in a weight ratio of solvent to water of about 55:45 to about 65:35, preferably about 60:40. A lower aqueous phase containing dissolved salts, which are believed to be basic sulfates corresponding to the bisulfite compound used during the defined addition reaction, and an upper organic phase containing the added solvent and the sulfonate addition product are obtained. Separation of the two phases is effected in any convenient manner, for example, by decantation. The organic phase is then dried, for example, at a temperature of about 50° to about 350° F., leaving behind a stabilized sulfonate addition product whose pH will remain constant over an extended period of time.

The process defined herein can further be understood by reference to the following examples.

EXAMPLE I 11,406 grams (60 mols) of sodium metabisulfite, $Na_2S_2O_5$ (equivalent to 120 mols of sodium bisulfite, $NaHSO_3$); 1008 grams (8 mols) of sodium sulfite, $Na_2SO_3$; 12,623 grams (75 mols) of dodecene-1; 47,340 grams of isopropyl alcohol; 20,000 grams of water; and 300 grams of azobisisobutyronitrile were charged to a 50-gallon glass-lined reactor. The mixture was heated with stirring at 170° F. for 14.25 hours. the reaction mixture was cooled to 130° F. and 30,000 grams of water was added. The mixture was then washed with hexane five times, with total hexane used being 90,718 grams. Air was passed through the mixture at 130° F. for four hours at 35 to 40 cubic feet per hour. The pH was then adjusted to 8.35 by adding a sodium hydroxide solution thereto. Net weight of product at this point was 116,300 grams (256.40 pounds). The air-treated product was then transferred to a 300-gallon stainless steel tank and 94,505 grams (208.35 pounds) of isopropyl alcohol was added. The temperature was held at 130° F. The mixture was stirred and then allowed to separate. 191,859 grams (422.98 pounds) of detergent solution was separated from the salt layer. The detergent slurry was concentrated to about 25 gallons by distilling off the isopropyl alcohol-water azeotrope. The remaining slurry was then dried on a double drum dryer to yield 18,688 grams (41.20 pounds) of dry detergent. The pH drift of a small sample of this product as measured on a 10 percent solution held at 70° C. (158° F.) for 72 hours was from 7.5 to 2.4.

EXAMPLE II 100 grams of the dry product prepared in Example I was mixed with 525 grams of water and 4.86 grams of sodium hydroxide. The mixture was charged to an autoclave and heated with stirring at 331° F. and autogenous pressure for four hours. It was then adjusted to pH 7.75 by the addition of dilute sulfuric acid and dried on a double drum dryer. The pH drift of a 10 percent solution at 70° C. for 72 hours was from 7.2 to 4.0.

EXAMPLE III 250 grams of the dry product prepared in Example I was mixed with 1000 grams of water in a glass flask. A stream of air was bubbled through the mixture held at 70° C. (158° F.) for 17.25 hours. The pH was then adjusted from 1.85 to 7.50 with sodium hydroxide and the product was dried in a double drum dryer. A small portion of the dry product was checked for pH drift. The pH drift of a 10 percent solution at 70° C. for 72 hours was from 6.3 to 3.9.

In each of the examples below treatment in accordance with our procedure resulted in a substantially stable detergent product.

EXAMPLE IV 120 grams of the dried product (after air treatment) from Example III was mixed with 3.52 grams of sodium hydroxide and 569 grams of water. The mixture was charged to an autoclave and heated with stirring at 330° F. and autogenous pressure for 4 hours. The pH was then adjusted to 7.80. The product was desalted by adding isopropyl alcohol thereo and separating the salt phase. The desalted product was then dried on a double drum dryer. The pH drift of a 10 percent solution at 70° C. for 72 hours was from 6.9 to 6.2.

EXAMPLE V 150 grams of the dried product prepared in Example I was mixed with 753 grams of water and 5.95 grams of sodium hydroxide. The mixture was charged to an autoclave and pressured to 250 pounds per square inch gauge with air. A slow flow of air was bubbled through the liquid at 250 pounds per square inch gauge as it was heated to 250° F. with stirring. These conditions were maintained for four hours. The pH was adjusted to 7.5 and the product was dried on a double drum dryer. The pH drift of a 10 percent solution at 70° C. for 72 hours was from 7.7 to 7.0.

EXAMPLE VI

The pH drift of a sample of $C_{16}$ sodium alkanesulfonate prepared by the addition of sodium bisulfite to hexadecene-1 by a procedure similar to that described in Example I was from 8.7 to 2.4 as measured on a 10 percent solution at 70° C. for 72 hours, 33,430 grams (73.7 pounds) of this dry product was charged to a 50-gallon glass-lined autoclave along with 124,828 grams (275.2 pounds) of water and 1,230 grams of sodium hydroxide. The autoclave was pressured to 250 pounds per square inch gauge with air; air was bubbled through the mixture at about 22.2 cubic feet per hour; and the mixture was heated with stirring to 200° F. These conditions were maintained for 8.5 hours. The excess sodium hydroxide was then neutralized with sulfuric acid and the product desalted and dried on a double drum dryer. The pH drift of a 10 percent solution of the product at 70° C. for 72 hours was from 7.0 to 5.5.

EXAMPLE VII

The pH drift of a sample of $C_{12}$ sodium alkanesulfonate prepared by the procedure of Example I as measured on a 10 percent solution at 70° C. for 72 hours was from 7.5 to 2.4. 30,164 grams (66.5 pounds) of this dry product was charged to a 50-gallon glass-lined autoclave along with 119,748 grams (264.0 pounds) of water and 1,320 grams of sodium hydroxide. The autoclave was pressured to 250 pounds per square inch gauge with air; air was bubbled through the mixture at about 29.2 cubic feet per hour; and the mixture was heated with stirring to 200° F. These conditions were maintained for three hours. The excess sodium hydroxide was then neutralized with sulfuric acid and the product desalted and dried on a double drum dryer. The pH drift of a 10 percent solution of the product at 70° C. for 72 hours was from 7.0 to 6.5.

Obviously many modifications and variations of the invention, as hereinabove set forth, can be made without departing from the spirit and scope thereof, and therefore only such limitations should be imposed as are indicated in the appended claims.

We claim:

1. A process for stabilizing the pH of the product obtained as a result of the addition to an olefinic compound of an alkali bisulfite in the presence of a free radical initiator which comprises contacting an aqueous slurry of said product containing an alkaline compound selected from the group consisting of sodium hydroxide, potassium hydroxide and ammonium hydroxide with oxygen at a temperature of about 70° to about 300° F. and a pressure of about 50 to about 400 pounds per square inch gauge over a period of about one to about 15 hours, the amount of said alkaline compound based on the sulfonate addition product being from about five to about 50 mol percent and the amount of oxygen based on the sulfonate addition product being from about 10 to about 200 mol percent.

2. The process of claim 1 wherein the alkali bisulfite is sodium bisulfite.

3. The process of claim 1 wherein the olefinic compound is a straight chain terminal olefin having from five to twenty carbon atoms.

4. The process of claim 1 wherein the free radical initiator is azobisisobutyronitrile.

5. The process of claim 1 wherein the alkali bisulfite is sodium bisulfite and the addition product obtained includes a sodium alkane sulfonate, a sodium alkane sulfinate-sulfonate and a sodium alkane disulfonate.

6. The process of claim 1 wherein the slurry is contacted with molecular oxygen.

7. The process of claim 1 wherein the temperature is in the range of about 150° to about 200° F., the pressure from about 200 to about 275 pounds per square inch gauge, the time from about two to about eight hours, the amount of said alkaline compound from about 10 to about 45 mol percent and oxygen from about 30 to about 140 mol percent.

References Cited

UNITED STATES PATENTS

| 3,306,931 | 2/1967 | Adams et al. | 260—513 B |
| 3,372,198 | 3/1968 | Cywinski | 260—597 |
| 3,349,122 | 10/1967 | Segessemann | 260—513 B |

OTHER REFERENCES

Gilbert: Sulfonation and Related Reactions, pp. 148–151 (1965).

DANIEL D. HORWITZ, Primary Examiner